(No Model.)  J. W. OSBORNE.  3 Sheets—Sheet 1.
PULLEY, ROLLER, OR WHEEL.
No. 289,368.  Patented Nov. 27, 1883.
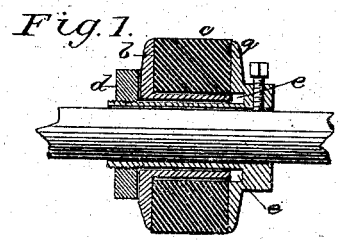
Fig. 1.
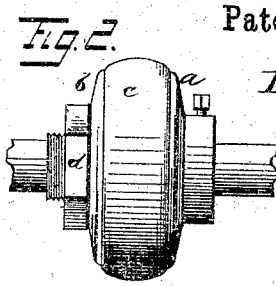
Fig. 2.
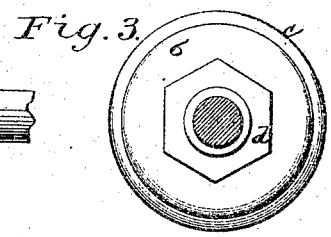
Fig. 3.
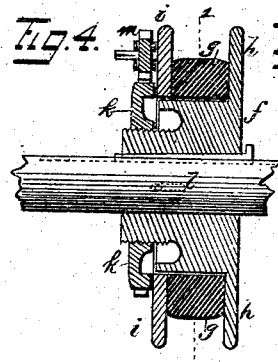
Fig. 4.
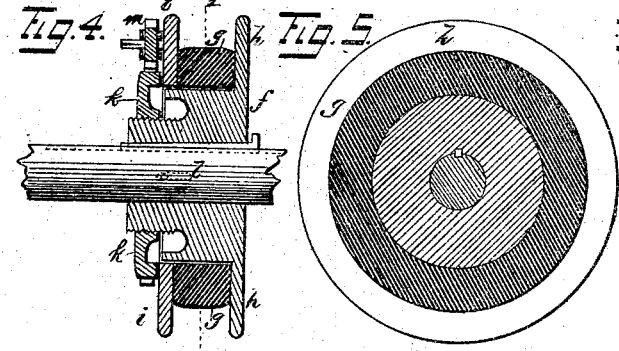
Fig. 5.
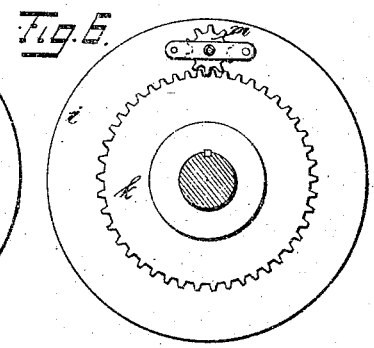
Fig. 6.
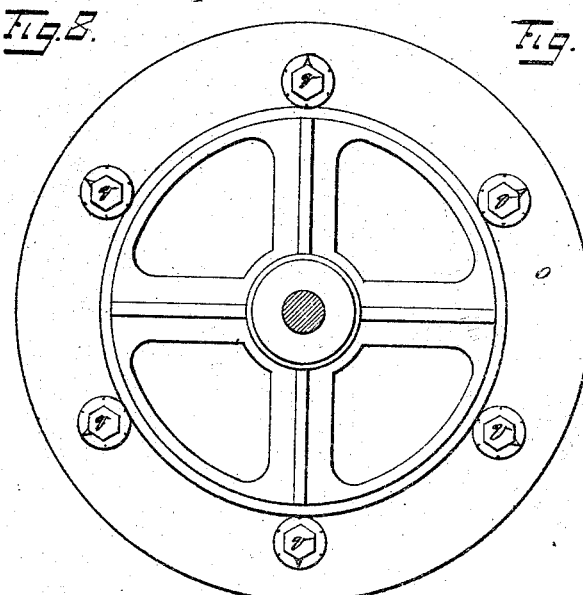
Fig. 8.  Fig. 7.
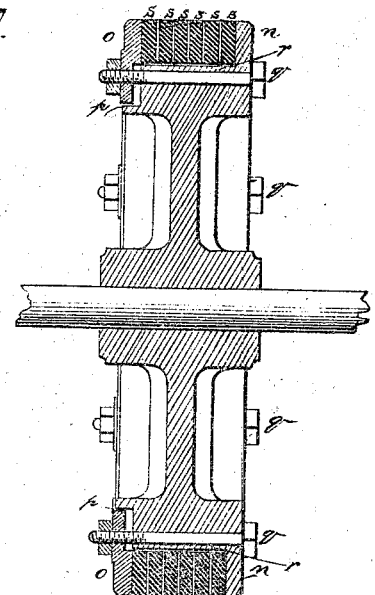
Witnesses:  Fig. 10.  Fig. 9.  Inventor:
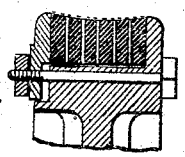
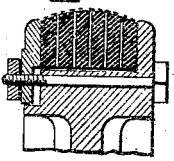

(No Model.) 3 Sheets—Sheet 2.

J. W. OSBORNE.
PULLEY, ROLLER, OR WHEEL.

No. 289,368. Patented Nov. 27, 1883.

Witnesses:
A. C. McArthur
Geo. P. Graham

Inventor.
John W. Osborne (No Model.) 3 Sheets—Sheet 3.

J. W. OSBORNE.
PULLEY, ROLLER, OR WHEEL.

No. 289,368. Patented Nov. 27, 1883.

Witnesses:
A. C. McArthur
Geo. F. Graham

Inventor
John W. Osborne

UNITED STATES PATENT OFFICE.

JOHN W. OSBORNE, OF WASHINGTON, DISTRICT OF COLUMBIA, ASSIGNOR TO WILLIAM H. FORBES, OF BOSTON, MASSACHUSETTS.

PULLEY, ROLLER, OR WHEEL.

SPECIFICATION forming part of Letters Patent No. 289,358, dated November 27, 1883.

Application filed October 3, 1881. (No model.)

*To all whom it may concern:*

Be it known that I, JOHN W. OSBORNE, of Washington, District of Columbia, have invented a new and useful Improvement in the Construction of Pulleys, Rollers, and Friction-Wheels, of which the following is a specification.

This invention is related, generally, to the devices employed for receiving or communicating motion by means of belts and bearing-surfaces generally, and specifically to the class of contrivances known as "expansible" pulleys and wheels. As now constructed, for the most part, the diameter of such pulleys, rollers, &c., is made changeable within certain limits by moving segments of the periphery farther from or nearer to the shaft or axle on which the pulley or wheel is fastened, or by adjusting conical surfaces on the same, so as to modify the position and radius of the driving portion; but when such methods are adopted, it becomes a problem presenting many difficulties to keep the expanded or contracted periphery of the pulley or roller continuous, and at the same time truly circular. In my invention I inclose one or more rings of elastic material—such as rubber—between flat metal rings or plates of the same or greater diameter, and by approaching said plates with the requisite force I cause the elastic substance to increase its size radially from the axis of the pulley or wheel, thereby increasing the diameter of the part over which a belt runs, or which has frictional contact with some other surface. Some of the ways in which this principle is put in practice are shown in the accompanying drawings, in which—

Figure 12:
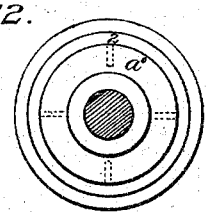
Figure 11:
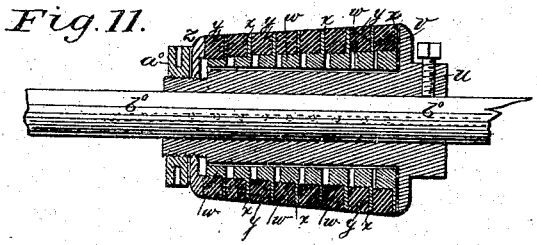
Figure 13:
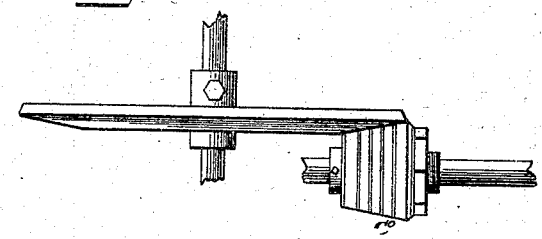
Figure 15:
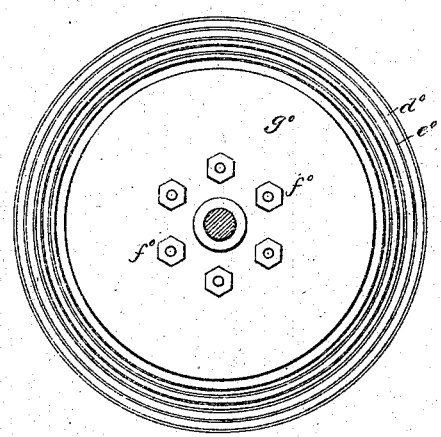
Figure 14:
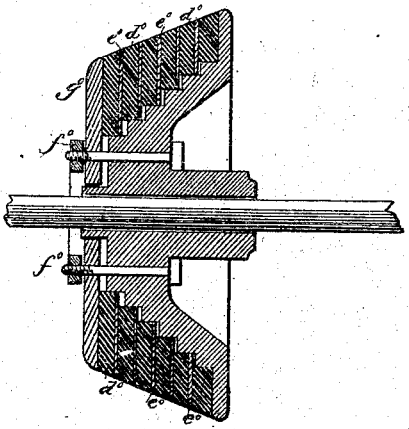
Figure 20:
Figure 21:
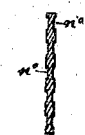
Figure 16:
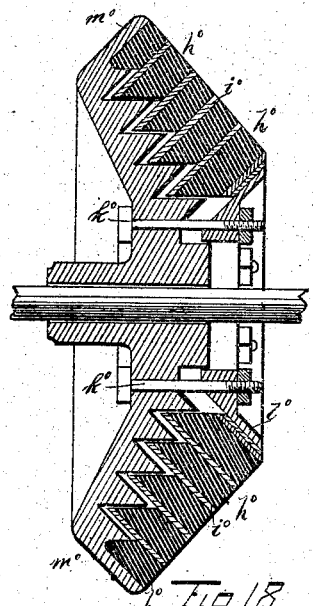
Figure 17:
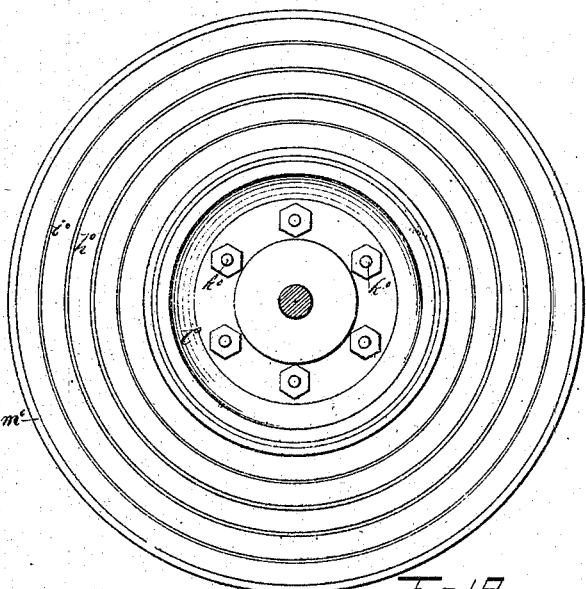
Figure 18:
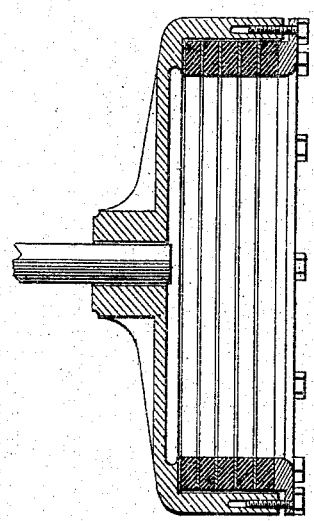
Figure 19:
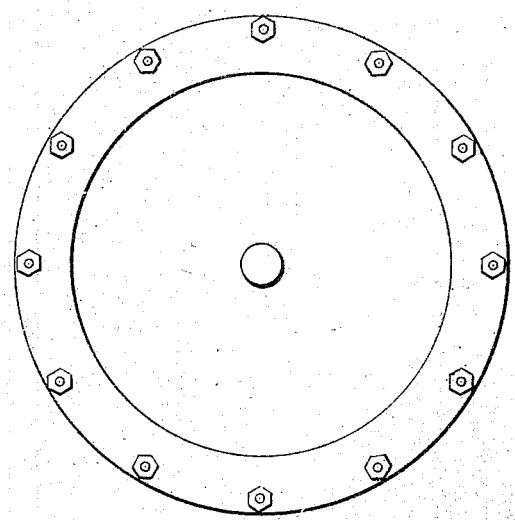

Figure 1 is a pulley in cross-section unexpanded; Fig. 2, the same in front elevation after expansion. Fig. 3 is a side elevation of the foregoing. Fig. 4 is the cross-section of a pulley of similar but modified construction expanded. Fig. 5 is a section of the same on line 1 1 of Fig. 4. Fig. 6 is a side elevation of the same, showing the method of adjusting the expansion. Fig. 7 is a cross-section of a pulley or wheel in which the expansible periphery or rim consists of a stratification of elastic and non-elastic material. Fig. 8 is an elevation of the same. Fig. 9 shows in cross-section part of a wheel similar to Fig. 7, in which the face is convex. Fig. 10 is the same as the foregoing, but with concave face. Fig. 11 shows in cross-section a bevel-pinion with stratified expansible face. Fig. 12 is a front elevation of the same. Fig. 13 shows in plan an expansible bevel-pinion in contact with a wheel. Fig. 14 shows in cross-section a bevel-wheel of modified construction. Fig. 15 is a front elevation of the same. Fig. 16 shows in cross-section an expansible miter-wheel of modified construction. Fig. 17 is a front elevation of the same. Fig. 18 shows in cross-section an annular wheel with stratified expansible rim. Fig. 19 is a front elevation of the same. Fig. 20 is an elevation of a portion of a dividing-plate. Fig. 21 is a radial cross-section of the same.

In Figs. 1, 2, and 3 the flange *a* forms one side of an expansible pulley. The flange or disk *b* forms the other side, and both flanges are fast, the one to the hub upon a shaft or spindle and the other to a sleeve sliding on the hub. When the flanges are separated the whole length of the sleeve, the space between them is filled by a ring of vulcanized rubber, *c*. This ring fits closely upon the sleeve, and has parallel sides. Its outer surface is ground off flush with the edges of the disks, and on this surface the belt runs when the pulley is in use. The hub has a thread cut upon it, and carries the nut *d*, by which the sides of the pulley can be forced together, in doing which the sleeve enters the recessed groove *e*, the depth of which determines the extent to which the compression can be carried. When pressure is applied by the nut, the elastic material between the flanges yields in the only way possible, which is radially from the center in every direction toward the unsupported circumference, and the diameter of the central working portion of the face is thereby increased. It will be seen that the construction is such that in effecting this compression all the sides of the rubber, except its face, are solidly supported at all times, and in consequence the change which takes place in its form is confined to one direction only. Nor can the rubber be forced into cavities, which, as the expansion is continued, are liable to close upon and hold it. By relaxing the nut the elasticity of the rubber restores it to its original condition, so that any desired diameter (between the two extremes) is obtainable. The form which the face assumes due to compression is a curve of greater or less convexity, according to the position of the nut and the width of the rubber, for, as the sides of the pulley offer very considerable friction, the particles of the elastic substance are hindered from moving along them, and, as their freedom to do so is greatest at the middle, the outward expansion is greatest there, and diminishes toward the sides, giving rise to a curve which is well adapted for carrying a belt and for driving other surfaces by friction, or being driven whenever a convex face is suitable. the elastic mass being thoroughly supported at all times by the side flanges and cylindrical sleeve below it.

Figs. 4, 5, and 6 represent a pulley similar in all essential respects to that just described, but differing from it in some details of construction. The body $f$ is constructed so that it can be keyed or otherwise fastened to the shaft. Upon it rests the rubber ring $g$ in contact with the fixed flange $h$. The movable ring $i$ slides upon the body, and is pressed against the rubber by the nut $k$, which, as it is screwed up, compresses the same more and more, thereby increasing the diameter of the working-face of the pulley. The movable flange may be prevented from turning by a small short pin upon its inner edge, moving in a shallow groove in the body. (Indicated by dotted lines at $l$.) The outside edge of the nut $k$ is a toothed wheel, into which meshes the little pinion $m$ on the flange $i$. Turning this pinion by means of a suitable key will cause the nut $k$ to revolve and effect the further compression of the rubber $g$, or a return in greater or less degree to its original flat form, according to the direction in which the pinion has been turned. It will be seen that in this case the flanges extend beyond the rubber face, giving it a form which is convenient for some purposes. A pulley of this kind is well adapted for carrying belting of every description, and especially metallic belting, because of the hold which the rubber takes upon such surfaces, giving rise to much friction, or resistance to slip, without adhesion. Furthermore, the thorough manner in which the rubber is supported insures the maintenance of its diameter when covered by the belt, as well as the positive movement of the latter, the elastic periphery being solid and unyielding beneath it. Very nice adjustments of speed can therefore be made, and when such are unimportant the expansible character of the pulley furnishes the best means possible for tightening metallic belting.

In carrying out my invention I use in certain cases—namely, when the pulley is not too small or the motion too rapid—other substances analogous to vulcanized rubber, and resembling it in possessing a great range of elasticity—as, for instance, the well-known mixture of glue and molasses, or glue and glycerine, with the addition of a very small quantity of water, both of which compounds are used in the arts for the manufacture of printers' rollers, and for other purposes. Elastic material of this sort is much cheaper than rubber, but it is also less durable.

When pulleys of large diameter are made expansible by my method, it will be generally found inconvenient to apply the lateral pressure necessary by means of a single concentric nut, for the reason, among others, that the pressure required will be great. This difficulty is overcome by using a number of bolts with nuts upon them in the manner shown in Figs. 7 and 8. In this case the body of the pulley or wheel has one fast flange, $n$, and a movable one, $o$, which takes the form of a flat ring. The latter slides upon the shoulder $p$, and both are held together, and the lateral pressure upon the elastic material between them is determined and controlled by means of the bolts $q\,q$, &c. These bolts, having screws of the same pitch, should be screwed up to precisely the same extent, and to facilitate this the nuts have each a little pointer, which traverses over a small circle marked with numbered divisions.

Figs. 7 and 8 furthermore illustrate a very important modification of my invention, by which the general face of an expansible pulley or wheel is maintained parallel to that given it before expansion, fitting it especially for use as friction-gearing. In Fig. 7 the metallic rim $r$ between the flanges $n$ and $o$ is turned off parallel to the axis. On the cylinder so formed a number of independent vulcanized-rubber rings, $s\,s$, &c., are fitted, extending outward to the edge of the flanges, and between each ring of rubber annular plates $t\,t$, of thin metal, are placed, the circular openings in which fit easily upon the metallic rim $r$. When the flange $o$ is tightened upon the rubber and metal rings, so as to bring all into contact, the whole face of the pulley is ground off flat down to the metal. If pressure be now applied to the rim formed of the elastic stratified material between the flanges, by screwing up the nuts $q\,q$, &c., equally all round the diameter of the pulley will be increased, and as each separate ring of rubber is of the same thickness and receives exactly the same amount of pressure, each will increase radially outward to the same extent, and the result will be a generally flat surface. Strictly speaking, each piece of rubber will have an independent convexity of its own; but as in such wheels a very small enlargement only is required, and as the surface the wheel works against tends to flatten the slight convexities produced, the face of the pulley will be flat for all practical purposes. A wheel so constructed, in contact with another like it, or with one having a flat metallic face, is well adapted to take in many cases the place of ordinary spur-gearing. For this purpose the face of the wheel may be made very broad where much power is transmitted; but it is then well to notch the thin metal plates $t\ t$, &c., at one or more places on their inner circumference corresponding to small flat fillets crossing the face of the rim $r$, (not shown in the drawings, as they would tend to confuse the same,) to the end that the thin plates may not be liable to turn upon the cylindrical surface and the rubber with them. When so constructed, this wheel will be found to act very efficiently, for the rubber used is so well supported that a very soft and pure quality can be employed, which grips much better and wears longer than those descriptions which are hardened and stiffened by the presence of foreign matters. When an expansible pulley of this description is required for a belt, metallic or otherwise, the face can be given the usual slight convexity by grinding the rubber and dividing-plates before expansion to the desired curve, as shown in Fig. 9, which will be afterward maintained without change. In like manner an expansible face can be produced which will remain generally concave, if for any particular purpose such should be required, as shown in Fig. 10; but in all such cases the rubber must be flush with the supporting metallic rings and flanges.

Figs. 11 and 12 illustrate the application of the principle of stratified elastic and non-elastic material just explained for the production of the expansible face of a long conical wheel or pinion used in changing the direction and angular velocity of rotating shafts in cases where considerable power is also transmitted. The stock or body of the wheel $u$ is provided with the flange $v$, which is fixed. Upon the cylindrical part of the stock the sliding rings $w\ w$, &c., are fitted, each of which carries a thin flange, $x\ x$, &c. Against each flange a rubber ring, $y\ y$, &c., is placed, somewhat thicker than the metal ring on which it rests. When the compound rings are placed in proper order, side by side, upon the stock, and pressed together solidly by the movable flange $z$, acted upon by the circular nut $a''$, the whole face of the wheel is ground off flush with the flanges at the ends, whereby the face is given the required inclination to the axis. The flanged rings $w\ w$, &c., and the flange $v$ are prevented from turning by a small projecting stud in each, which slides forward in the shallow groove indicated by dotted lines at $b''$. A wheel so constructed admits of expansion without change of angle, and with a generally flat bearing-surface by screwing up the nut $a''$, the diameter of every part of the wheel being thereby increased.

Fig. 13 illustrates in plan the manner in which an expansible pinion, $c''$, of this description works against a bevel-wheel with flat metal face. In this case the shafts are at right angles, and the angular velocity will be as four is to one.

Figs. 14 and 15 show in section and elevation the adaptation of this principle, with certain modifications, to the construction of a bevel-wheel of larger size, requiring considerable force for its expansion. In this case the body of the wheel is turned so as to form a number of steps, to each of which a rubber ring, $d°\ d°$, &c., is fitted. A circular flat plate, $e°\ e°$, &c., is interposed between each ring and that next following it, the rubber being a little thicker than the step on which it rests to allow for compression, and the plate from which it receives the pressure moving forward upon the next step of larger diameter. In this way the force exerted by the nuts $f°\ f°$, &c., through the intervention of the movable flange $g°$, is communicated uniformly and equally to each of the rubber rings in the series, resulting in the expansion of each and the consequent enlargement of the diameter of the wheel. In the construction of this wheel it will be seen that a gradual decrease takes place in the depth of the rubber rings employed, and that in this respect it differs from Figs. 11 and 12. This is a provision which I adopt (when the increase of the angle which the face of the wheel makes with the axis renders it necessary) for the purpose of equalizing the expansion of each separate ring, so as to secure a generally flat face parallel to that originally formed upon the wheel, for while the lateral pressure is the same on all the rings, the side area (when they are of equal depth) increases as they become of larger diameter, and the pressure upon a unit of surface becomes less, which results in less radial expansion. This decrease is compensated for to a greater or less extent by the increased mass of rubber available for expansion, said compensation varying with the quality of the rubber used, its thickness, the mobility of its particles, &c., so that it is not possible without trial to determine in any particular case how much the inside diameter of the larger rings should be increased to obtain that degree of pressure per unit of surface which will best accomplish the end in view, and therefore the progressive change in this respect shown in Fig. 14 should only be regarded as approximately correct.

Figs. 16 and 17 illustrate a modification of this method of construction which may be adopted for miter-wheels, and those in which the face makes an angle greater than forty-five degrees with the axis. In this case the rubber rings $h°\ h°$, &c., are conical, as are also the thin dividing-plates $i°\ i°$, &c., and the pressure is applied by the compressing-bolts $k°\ k°$, &c., through the intervention of the conical flange $l°$, which, while it moves forward in a direction parallel to the axis, gives a resultant parallel to the face and in a direction at right angles to the opposing flange $m°$. When the expansion of a miter-wheel of this construction is effected, it takes place upon the squarely cut or ground surface of each ring of rubber, and not upon that which is cut obliquely, as in the case of the bevel-wheel previously described, and it is in a direction perpendicular to the face and not to the axis, as in Fig. 14. Nevertheless, while these are advantages applicable to a wheel of any angle, they involve greater complexity in the manufacture, and it will be found that in very many cases, especially where the face makes an angle of less than forty-five degrees with the axis, the simpler arrangement is quite satisfactory. This method of constructing friction-gearing has many advantages. In erecting such the face of the opposing wheel is brought in contact, or very nearly in contact, with the edges of the flanges on the wheel which holds the stratified rubber, and when the journals are fast the friction between the two is increased by expansion until it is enough for the transmission of the power required. The amount necessary to accomplish this is very small, due to the construction employed, as the edges of the rubber face on both sides begin to bear as soon as the center portion. Any wear which takes place in time on the flat surface, and any subsequent increase in the power to be transmitted, are provided for by simply screwing up the compression-nuts. As before stated, soft and pure rubber can be used because of the very perfect support given to it throughout, whereby it acts as if much stiffer, firmer, and harder than it really is. This depends upon the fact that in itself rubber is not compressible, and to yield must escape in some direction. Used in the manner I have described its opportunities for escape are small, while in doing so the line of contact is slightly broadened across the face. It is for this reason, also, that a pulley so constructed is especially fitted for carrying an unyielding metallic belt; but in that case the requisite convexity is given to the stratified rubber from the start, which curve is afterward maintained, whether it be expanded to adjust the speed with accuracy or to tighten the belt, which latter operation is better done in that way for such belts than in any other.

The expansion principle, as I have applied it to friction-gearing and described it herein, not only obviates all adjustment from time to time of the bearings on which the wheels rotate, but it also acts very beneficially in holding the rubber upon the rim of the wheel, for when pressure is applied laterally, the rubber behaves much as if it were a liquid. It presses in every direction and grasps, in consequence, the body of the wheel under it, the flanges at the sides, and the dividing plates with much force, whereby any movement or slip is prevented. For bevel-gearing it is especially useful, overcoming the difficulties which the accurate construction and cutting of toothed gearing of this kind gives rise to and the expense attending the same.

As a substitute for annular gearing illustrated in Figs. 18 and 19, the principle of expansion is also applicable. The grip on the pinion in this case is very strong, and its size is not subject to the limitations appertaining to toothed gearing of this kind.

In the several applications of rubber and analogous bodies for the construction of pulleys, rollers, and friction-wheels described in this specification, the support which the rubber receives from the flanges or plates which grasp it is of the utmost importance. This support is not given if the elastic substance extends beyond the same, unless such extension be the legitimate result of lateral pressure only, when it forms the characteristic curve springing from the side supports, and presenting a solid tense surface. It is important, therefore, that the flanges and plates should hold the rubber without allowing it to slip along their surfaces. In most cases the friction is so great between the rubber and the metal plates which hold it that there is no danger of the former slipping on them even before the pressure becomes considerable, after which it is always held firmly; but with certain inferior kinds of rubber it is desirable to prevent the possibility of any movement which may result in the elevation of unsupported material at the sides, and this is easily effected by undercutting the flanges, and in a variety of other ways. I prefer, however, to cut a number of concentric depressions on the surfaces where a slip may take place, into which the mass is forced when the pressure first affects it, and which effectually prevents its movement over them.

In Fig. 20 an elevation on a large scale is shown of a portion of an annular plate used in the stratifying of rubber or analogous bodies forming the elastic bearing-rim on a pulley or wheel, and in Fig. 21 the same is shown in radial cross-section. In both figures the depressions referred to are represented at $n^\circ$ $n^\circ$, &c.

I am aware that rubber has been used for friction-rollers, and that rubber wheels have been held and compressed by side plates, so as to swell the overhanging and projecting part; but in the devices of which I have any knowledge that part of the mass which is held and supported, and which, in consequence, has resistance and driving capacity, carries upon it a soft, yielding, unsupported mass, held only by adhesion to that which is beneath it, and capable of maintaining its position by virtue of its tensile strength alone. When a wheel so constructed is pressed into contact with a surface of any kind, the superfluous rubber evades the same, it escapes and extends laterally, and a wave rises in the flexible material, which is forced to travel the whole circumference at the speed of rotation, involving a vast amount of useless work and the rapid disintegration of the rubber. In my invention, by adapting the thickness of the individual pieces of elastic material and their number to the pressure applied and the work demanded of them, the support they receive is always efficient, and will be found to solidify and sustain the surface in a marked and decided manner. In a wheel so constructed every part of the face accomplishes the maximum result with the least possible waste of power and wear.

I am aware that expansible pulleys have been constructed by inserting rubber rings and rubber disks between compression-plates, so as to be expanded by the application of lateral pressure, and to such combination I lay no claim. My invention contemplates the employment, with side plates or heads, of a material—such as metal or hard rubber—which combines in itself the qualities of flexibility, hardness, and incompressibility, in consequence of which I am enabled to give my pulley a definite and uniform enlargement in all directions, and to secure and maintain an accuracy of form not obtainable by the employment of soft rubber in any manner hitherto practiced.

I am aware that in a patent for pulleys designed to sustain wire ropes a central rubber band is illustrated between two wooden hubs, by which it is sustained, the hubs having a very limited capacity of adjustment toward each other for the purpose of binding the rubber between them, and the expansion of the pulley not being in view.

I do not claim to be the first to confine rubber between disks; but I believe myself to be the first to combine with a rubber body for a pulley outside disks terminating flush with the rubber at the periphery, and so arranged and combined with adjusting devices that they may be given a wide range of adjustment to and from each other, so as to produce a practical expansion-pulley.

Having thus fully described my invention and the manner in which the same is carried out, what I claim, and wish to secure by Letters Patent, is—

1. A pulley of variable diameter, consisting of a body or ring of rubber, two circular side flanges adapted for a wide range of adjustment to and from each other while in contact with the rubber and flush therewith at the periphery, and means, substantially as described, for forcibly moving said plates toward each other, whereby the rubber body may be extended uniformly in all directions.

2. In an expansible pulley or roller, the combination of two circular side flanges with alternating rings of elastic and non-elastic material, all placed flush with the flanges and between the same, and means, substantially as described, for approaching said flanges relatively to each other.

3. In an expansible pulley, the combination, as described, of a hub and its flange, a sliding sleeve and its flange, and a ring of elastic material, with means for approaching said flanges.

JOHN W. OSBORNE.

Witnesses:
 GEO. F. GRAHAM,
 L. C. YOUNG.